(12) United States Patent
Riepling

(10) Patent No.: US 11,670,161 B2
(45) Date of Patent: Jun. 6, 2023

(54) REMOTE CONTROL SYSTEM FOR IMPROVING TARGET SPECIFICITY

(71) Applicant: Roku, Inc., San Jose, CA (US)

(72) Inventor: Eric Casten Riepling, Soquel, CA (US)

(73) Assignee: ROKU, INC., San Jose, CA (US)

( * ) Notice: Subject to any disclaimer, the term of this patent is extended or adjusted under 35 U.S.C. 154(b) by 14 days.

(21) Appl. No.: 17/332,342

(22) Filed: May 27, 2021

(65) Prior Publication Data

US 2022/0383731 A1 Dec. 1, 2022

(51) Int. Cl.
*G08C 23/04* (2006.01)
*H04B 10/50* (2013.01)

(52) U.S. Cl.
CPC .......... *G08C 23/04* (2013.01); *H04B 10/501* (2013.01)

(58) Field of Classification Search
None
See application file for complete search history.

(56) References Cited

U.S. PATENT DOCUMENTS

| | | | | |
|---|---|---|---|---|
| 5,530,577 A * | 6/1996 | Ohno | ................. | H04B 10/1125 398/164 |
| 6,222,656 B1 * | 4/2001 | Eu | .......................... | G02B 6/266 359/227 |
| 8,451,224 B2 * | 5/2013 | Doumuki | .............. | G06F 3/0346 345/157 |
| 2007/0140697 A1 | 6/2007 | Miyake et al. | | |
| 2008/0152347 A1 | 6/2008 | Chen | | |
| 2010/0053465 A1 * | 3/2010 | Rogers | ................... | G08C 23/04 348/734 |
| 2015/0369742 A1 * | 12/2015 | Tamada | ................ | G01N 21/65 356/301 |
| 2018/0165951 A1 * | 6/2018 | Kim | ........................ | G06F 3/167 |
| 2020/0041710 A1 * | 2/2020 | Rong | ................... | G02B 6/0006 |

OTHER PUBLICATIONS

International Search Report and Written Opinion of the International Searching Authority directed to related International Patent Application No. PCT/US2022/030514, dated Sep. 15, 2022; 7 pages.

* cited by examiner

*Primary Examiner* — David W Lambert
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for a remote control system that improves one or more of directionality, target specificity, signal specificity, and bandwidth. An example embodiment is a remote control system that includes a radiation source configured to generate an infrared radiation projection based on one or more remote control codes to control a device. The remote control system further includes an optical controller configured to adjust one or more parameters associated with the infrared radiation projection before the infrared radiation projection is emitted to the device.

20 Claims, 10 Drawing Sheets

REMOTE CONTROL SYSTEM FOR IMPROVING TARGET SPECIFICITY

CROSS-REFERENCE TO RELATED APPLICATIONS

This application is related to U.S. patent application Ser. No. 17/332,353 titled "Environmentally Aware Remote Control," filed herewith; the entirety of which is herein incorporated by reference for all purposes.

BACKGROUND

Field

This disclosure is generally directed to a remote control system, and more particularly to a remote control system that can improve radiation projection directionality and target specificity.

Background

A remote control device (e.g., a remote control device operating using electric and magnetic field (EMF) frequencies) can be used to control an electronic device. The EMF frequencies can include, but are not limited to, infrared (IR), radio frequency (RF), ultraviolet (UV), visible light, etc. The EMF signal from the remote control device propagates as a wide beam and can be reflected by other materials that are in near the electronic device. If two or more similar or substantially similar electronic devices with their corresponding remote control receivers are located close together, a first electronic device may function in an undesired manner when a signal intended for the second electronic device is detected.

A remote control device utilizing a more coherent output, e.g., an IR laser or beamformed RF may improve the direction specificity of the remote control. However, the IR laser requires more power and is more expensive to use in remote control devices. Also, using more coherent EMF sources in remote control devices does not solve problems with reflection of the IR laser from the surfaces of materials in the proximity of the electronic device controlled by the remote control device.

SUMMARY

Provided herein are system, apparatus, article of manufacture, method and/or computer program product embodiments, and/or combinations and sub-combinations thereof, for a remote control system improving the directional specificity and reflection issues discussed above and reduce power requirements while without increasing power consumption and cost.

According to some embodiments, a remote control system includes a processing module configured to receive a signal from a user interface and generate, based on the received signal, one or more remote control codes for controlling a device. The remote control system further includes a source coupled to the processing module and configured to generate an electric and magnetic field (EMF) projection based on the one or more remote control codes for controlling the device. The remote control system further includes a controller configured to adjust one or more parameters associated with the EMF projection before the EMF projection is emitted to the device. The controller includes at least one of a collimator configured to adjust convergence or divergence of the EMF projection, a polarizer configured to adjust a polarization of the EMF projection, an attenuator configured to adjust an energy of the EMF projection, or a translator configured to change a frequency or a frequency range associated with the EMF projection.

According to some embodiments, a remote control system includes a radiation source configured to generate an infrared radiation projection based on one or more remote control codes to control a device. The remote control system further includes an optical controller configured to adjust one or more parameters associated with the infrared radiation projection before the infrared radiation projection is emitted to the device.

In some embodiments, the optical controller includes a collimator configured adjust convergence or divergence of the infrared radiation projection before the infrared radiation projection is emitted to the device. In some embodiments, the collimator is a fixed collimator or an adjustable collimator.

In some embodiments, the optical controller includes a polarizer configured to adjust a polarization of the infrared radiation projection before the infrared radiation projection is emitted to the device. In some embodiments, the polarizer is a fixed polarizer or an adjustable polarizer. In some embodiments, the adjustable polarizer includes a rotating polarizer including a plurality of polarizing elements.

In some embodiments, the optical controller includes an attenuator configured to adjust an energy of the infrared radiation projection. In some embodiments, the attenuator is configured to adjust a signal power level associated with the infrared radiation projection before the infrared radiation projection is emitted to the device. In some embodiments, the attenuator includes a neutral density filter with graduation oriented in a polar manner to allow for selective attenuation by rotation through gradually increased filtering. In some embodiments, the attenuator includes a graduated neutral density filter with a linear graduation to allow for selection using a shifting or sliding mechanism.

In some embodiments, the remote control system includes an electronic attenuator configured to adjust one or more parameters associated with a signal used to generate the infrared radiation projection.

In some embodiments, the optical controller includes one or more of a collimator, a polarizer, and an attenuator. In some embodiments, the radiation source includes one or more electric and magnetic field (EMF) sources configured to generate an EMF projection comprising the infrared radiation projection.

In some embodiments, the optical controller is configured to adjust the one or more parameters associated with the infrared radiation projection such that direction specificity of the remote control system to control the device is increased.

In some embodiments, the radiation source is part of a remote control device and the optical controller is an add-on device coupled to the remote control device.

In some embodiments, the remote control system further includes a processing module configured to receive a signal from a user interface and generate, based on the received signal, the one or more remote control codes for controlling the device.

In some embodiments, the remote control system further includes electric and magnetic field (EMF)-to-EMF translator configured to receive the infrared radiation projection and generate an EMF signal based on the infrared radiation projection.

According to some embodiments, a method includes generating, using a radiation source of a remote control system, an infrared radiation projection to control a device. The method further includes adjusting, using an optical controller, one or more parameters associated with the infrared radiation projection before the infrared radiation projection is emitted to the device. The one or more parameters can include one or more of convergence or divergence of the infrared radiation projection, a polarization of the infrared radiation projection, or an energy of the infrared radiation.

According to some embodiments, a system includes a remote control system and a receiver device. The remote control system includes a radiation source configured to generate an infrared radiation projection to control a device. The remote control system further includes an optical controller configured to adjust one or more parameters associated with the infrared radiation projection before the infrared radiation projection is emitted to the device. The one or more parameters can include one or more of convergence or divergence of the infrared radiation projection, a polarization of the infrared radiation projection, or an energy of the infrared radiation. The receiver device is located at the device to be controlled. The receiver device is configured to receive the infrared radiation projection to generate a control signal for controlling the device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a remote control system that improves one or more of directionality, target specificity, signal specificity, and bandwidth of the remote control system without increasing power consumption and cost.

A remote control system can control the operations of one or more devices. According to some embodiments, the remote control system can control the operations of devices such as, but not limited to, TVs, set-top boxes, DVD players, video players, audio/video receivers, game consoles, electronic fans, electronic heaters, air conditioning devices, cameras, camera flashes, lights, motorized shades, door openers, and the like. These devices are provided as examples and the remote control embodiments of this disclosure can be used to control the operations of other devices.

According to some embodiments, the remote control system can include a remote control device using EMF frequencies. The EMF frequencies can include, but are not limited to, infrared (IR), radio frequency (RF), ultraviolet (UV), visible light, etc. Some embodiments of this disclosure are discussed with respect to an infrared (IR) remote control device (sometime referred herein as infrared or IR emitter). However, the embodiments of this disclosure are not limited to IR remote control devices and can include remote control devices operating based on other EMF frequencies. The remote control system can use signals (e.g., radiation projection) in the EMF frequencies to control the operations of an electronic device. The remote control system can generate different codes for different functions of the device that the remote control device controls. The remote control system can send these codes using the EMF frequencies (such as, but not limited to IR radiation projection).

As discussed in more detail below, the remote control system of this disclosure can use, for example, an optical controller to control and/or adjust one or more parameters associated with an EMF signal (such as, but not limited to IR radiation projection) before the EMF signal is emitted to the device being controlled by the remote control system.

Figure 1:
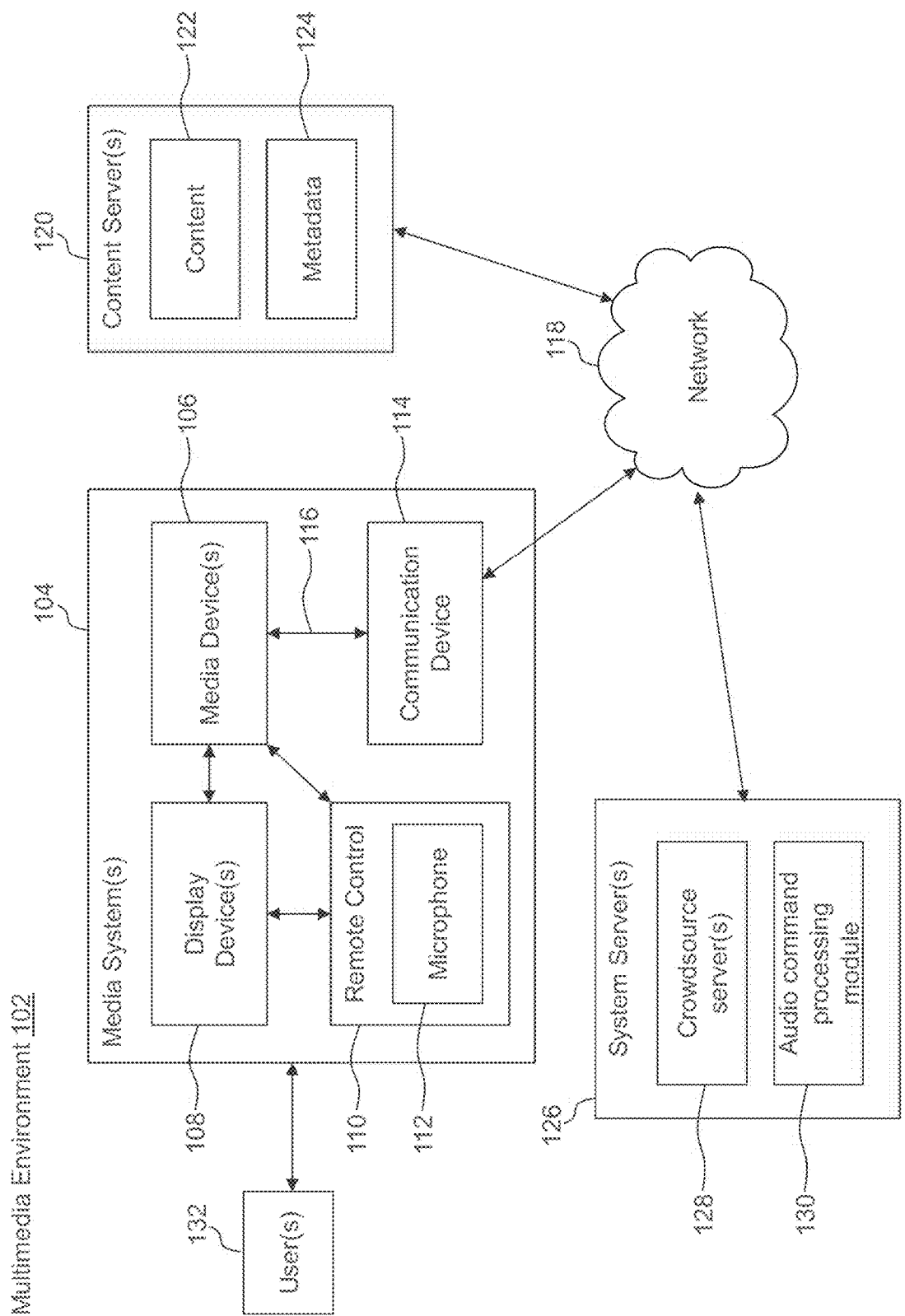
FIG. 1 illustrates a block diagram of a multimedia environment, according to some embodiments of this disclosure.

The remote control embodiments of this disclosure can be implemented in a multimedia environment 102 shown in FIG. 1. For example, various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102 that includes the remote control embodiments of this disclosure, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (for example, a wireless local area network (WLAN) such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below. According to some embodiments, remote control 110 can include one or more of the remote control embodiments as discussed in more detail below with respect to FIGS. 3-9.

The multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 includes data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
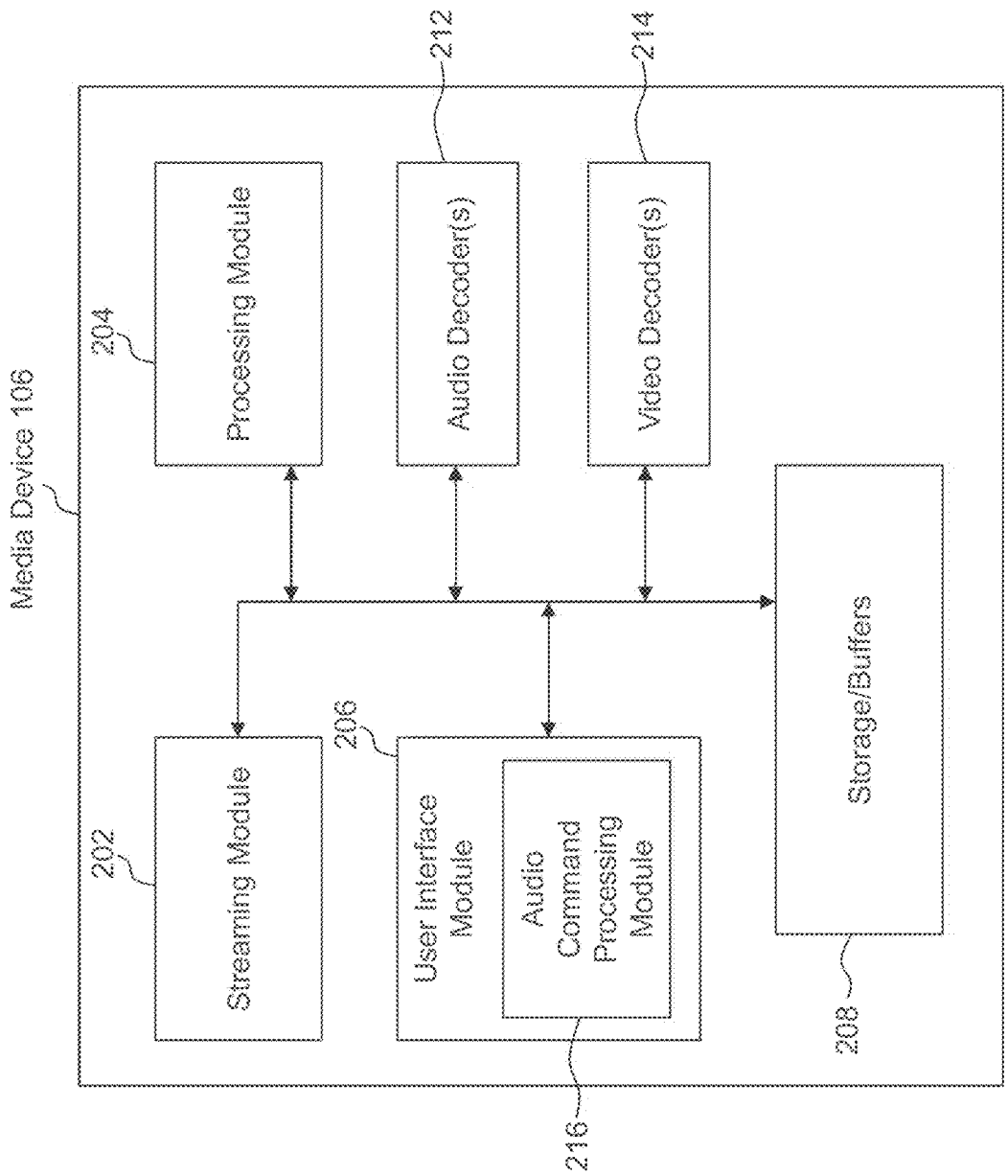
FIG. 2 illustrates a block diagram of a streaming media device, according to some embodiments of this disclosure.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 108 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Exemplary Multi-Device Environment

Figure 3:
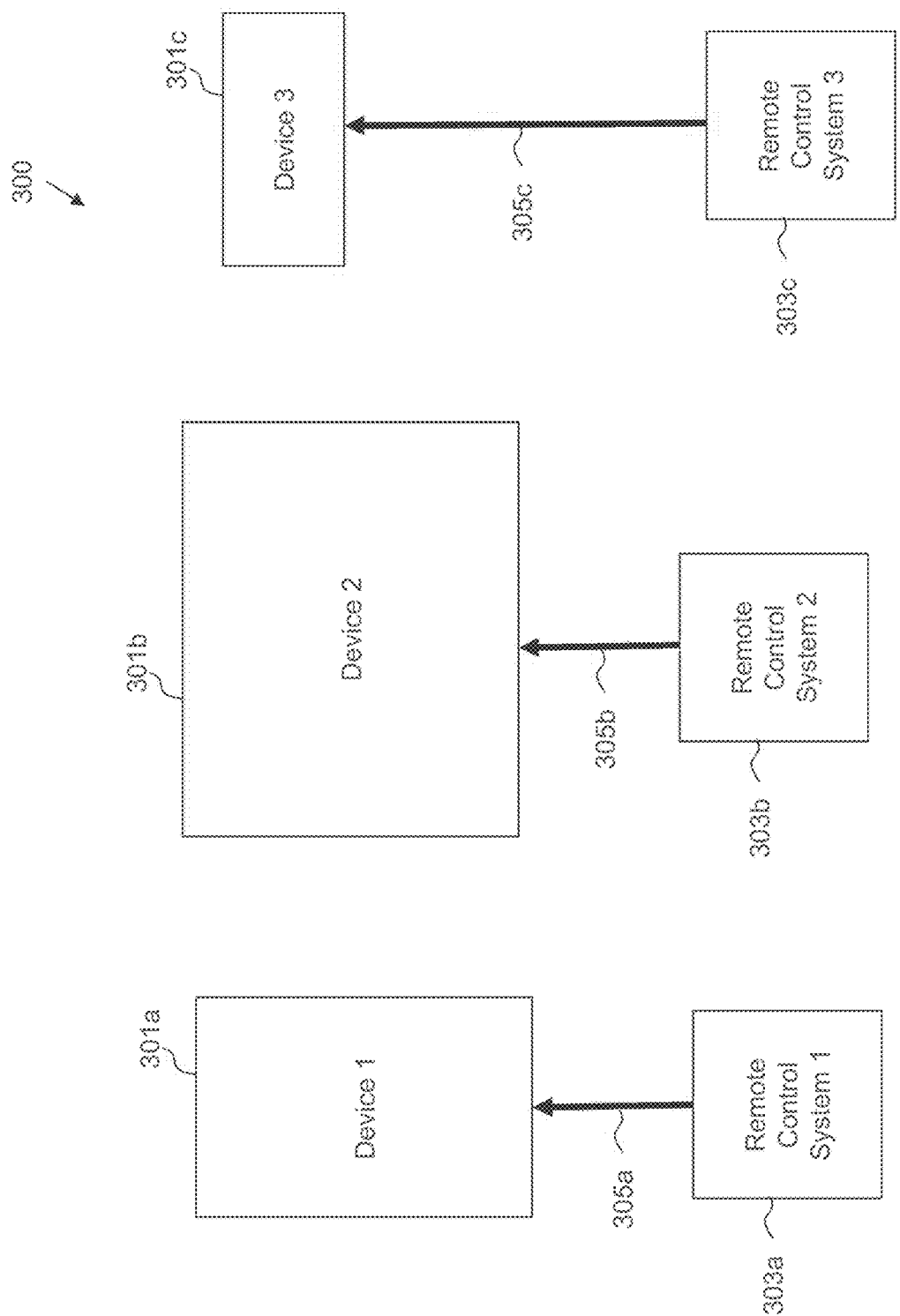
FIG. 3 illustrates another exemplary environment for operating a remote control system, according to some embodiments of this disclosure.

As discussed above, the remote control system of this disclosure can be part of multimedia environment 102 of FIG. 1 (e.g., remote control 110 of FIG. 1). FIG. 3 illustrates another exemplary environment 300 for operating the remote control system, according to some embodiments of this disclosure. As illustrated in FIG. 3, environment 300 can include devices 301a-301c. Devices 301a-301c can include, but are not limited to, televisions (TVs), set-top boxes, cable boxes, DVD or BLU-RAY players, video players, audio/video receivers, game consoles, digital video recording device, computers, smart phones, tablets, wearable devices (such as a watch or glasses), appliances, internet of things (IoT) devices, projectors, electronic fans, electronic heaters, air conditioning devices, cameras, camera flashes, lights, motorized shades, door openers, and the like. In some embodiments, devices 301a-301c can include homogeneous devices (e.g., same or similar kind of devices). These devices are provided as examples device 301a-301c and can include other devices.

In some embodiments, each device 301 can have an associated remote control system 303. For example, remote control system 303a can be configured to control operations of device 301a using remote control codes. In some examples, remote control systems 303a-303c are similar remote controllers associated with homogeneous devices (e.g., same or similar kind of devices). According to some embodiments, remote control system 303 can include an IR remote control system. However, the embodiments of this disclosure are not limited to these examples and remote control system 303 can include a remote control system operating based on other EMF frequencies. Remote control system 303a can control operations of device 301a using remote control codes sent through EMF projection 305a. In some embodiments, EMF projection 305a can include IR radiation projection 305a.

As discussed in more detail below, remote control system 303 can use an optical controller to control and/or adjust one or more parameters associated with the EMF signal (e.g., IR radiation projection 305) before the EMF signal (e.g., IR radiation projection 305) is emitted to device 301 that is being controlled by remote control system 303.

According to some embodiments, the optical controller of remote control system 303 can include one or more components configured to adjust convergence and/or divergence of IR radiation projection 305. Controlling the convergence and/or divergence of IR radiation projection 305 can include controlling the light projection focal point of IR radiation projection 305. By controlling the convergence and/or divergence of IR radiation projection 305, the directionality and target specificity of IR radiation projection 305 can be controlled. For example, by controlling the convergence and/or divergence of IR radiation projection 305a, remote control system 303a can control the operations of device 301a without affecting the operations of devices 301b and 301c.

Additionally, or alternatively, the optical controller of IR remote control system 303 can include one or more components configured to adjust a polarization of IR radiation projection 305. In some examples, by adjusting the polarization of IR radiation projection 305, the target specificity of IR radiation projection 305 can be controlled. For example, by controlling the polarization of IR radiation projection 305a, remote control system 303a can control the operations of device 301a without affecting the operations of devices 301b and 301c.

In addition to, or alternate to, controlling the target specificity of IR radiation projection 305, adjusting the polarization of IR radiation projection 305 can be used to multiplex different data and/or control signals at remote control system 303. In a non-limiting example, remote control system 303a can be used to control devices 301a-301c. In this example, the control signals for devices 301a-301c can be multiplexed into one signal. By adjusting the polarization of IR radiation projection 305a, remote control system 303a can control which control signal is sent to which device. For example, remote control system 303a can choose a first polarization for IR radiation projection 305a to control device 301a. Remote control system 303a can use a second polarization for IR radiation projection 305a to control device 301b. Remote control system 303a can use a third polarization for IR radiation projection 305a to control device 301c. In this example, a bandwidth (BW) of a communication channel used for communicating the data/control signal between the remote control system and the devices can be increased.

Additionally, or alternatively, the optical controller of remote control system 303 can include one or more components configured to adjust (e.g., reduce or attenuate) an energy of IR radiation projection 305. Controlling the energy of IR radiation projection 305 can include controlling the brightness of IR radiation projection 305. By controlling the energy of IR radiation projection 305, the directionality and target specificity of IR radiation projection 305 can be controlled. For example, by controlling the energy of IR radiation projection 305a, remote control system 303a can control the operations of device 301a without affecting the operations of devices 301b and 301c.

Although some embodiments of this disclosure are discussed with respect to the convergence and/or divergence, the polarization, and the energy of the IR radiation projection, the embodiments of this disclosure can include other components configured to control/adjust other parameters associated with the IR radiation projection before the IR radiation projection is emitted to the device being controlled by the IR remote control system. For example, remote control system 303 can be configured to control or adjust a frequency and/or a frequency range of the IR radiation projection. In one example, remote control system 303 can be configured to control or adjust a frequency and/or a frequency range of an EMF projection to another different EMF frequency and/or frequency range. According to some embodiments, remote control system 303 can include a frequency translator (e.g., an EMF-to-EMF translator such as, but not limited to, an IR-to-RF (radio frequency) translator). In this example, the frequency translator receives a first EMF signal/projection that has a first frequency and/or a first frequency range generated by remote control system 303 and determines the control signal associated with the EMF signal/projection. The translator then generates a second EMF signal/projection based on the control signal to be transmitted to the device that is being controlled (e.g., device 301) by remote control system 303. The second EMF signal/projection has a second frequency and/or a second frequency range different than the first frequency and/or the first frequency range. In the non-limiting example of the IR-to-RF translator, the IR-to-RF translator receives the IR radiation projection generated by remote control system 303 and determines the control signal associated with the IR radiation projection. The IR-to-RF translator then generates an RF signal based on the control signal to be transmitted to the device that is being controlled (e.g., device 301) by remote control system 303. The IR-to-RF translator can include, or be coupled to, a transceiver to transmit the RF signal to the device that is being controlled. The RF signal can include a Bluetooth™ signal, a wireless local area network (WLAN) communication signal, a peer-to-peer signal, an RF signal associated with signal $3^{rd}$ Generation (3G), 4G, Long-Term Evolution (LTE), 5G, or 5G-NR (new radio), and the like.

Device 301 that is being controlled by remote control system 303 can include an RF receiver configured to receive the RF signal from remote control system 303. In this example, a parameter of the IR radiation projection (e.g., the frequency or the frequency range) is translated using the IR-to-RF translator of remote control system 303.

According to some embodiments, the optical controller of IR remote control system 303 can include a plurality of components where each one (or a set of) the plurality of components can be used to control/adjust one of a plurality of parameters associated with IR radiation projection 305.

According to some embodiments, the optical controller of remote control system 303 can include one or more fixed components configured to adjust one or more parameters associated with IR radiation projection 305. Additionally, or alternatively, the optical controller of remote control system 303 can include one or more adjustable components configured to adjust one or more parameters associated with IR radiation projection 305.

According to some embodiments, the optical controller can be part of the remote control device. Additionally, or alternatively, the optical controller can be an add-on to the remote control device to construct the remote control system 303.

Figure 4:
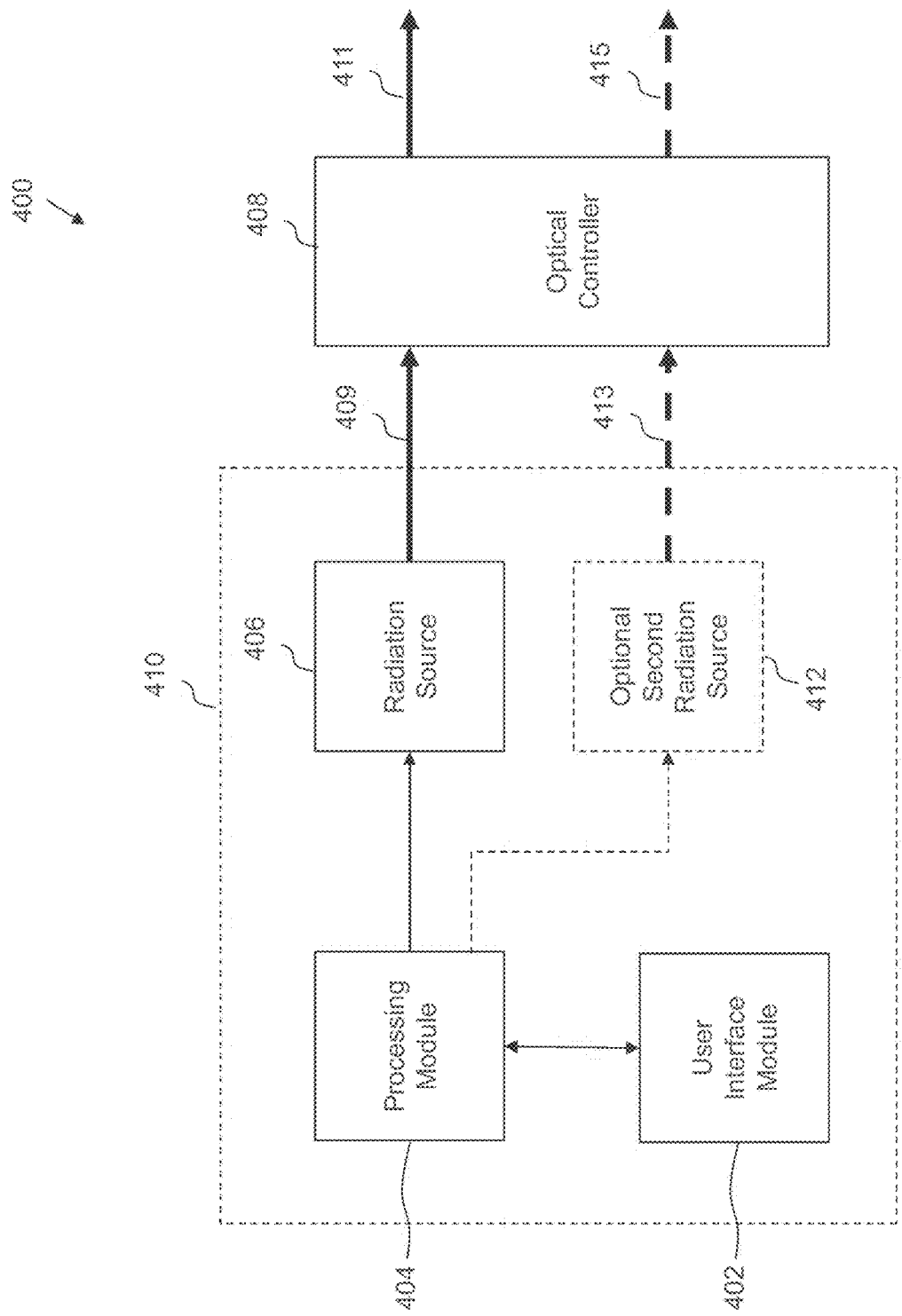
FIG. 4 illustrates a block diagram of an example remote control system, according to some embodiments of this disclosure.

Although FIG. 3 illustrates devices 301a-301c as three separate devices, the embodiments of this disclosure are not limited to this example. For example, each of devices 301a-301c can be a component (e.g., a sensor) on one device to be controlled by same or different remote control systems. Although FIG. 3 is discussed with respect to IR radiation projection 305, projection 305 can include an EMF projection (e.g., a projection and/or a signal based on EMF frequencies such as, but are not limited to, IR, RF, UV, visible light, etc.). The embodiments of this disclosure can include one or more of controlling and/or adjusting the convergence and/or divergence of the EMF projection, the polarization of the EMF projection, adjusting (e.g., reducing or attenuating) the energy of the EMF projection, or controlling and/or adjusting a frequency and/or a frequency range of the EMF projection FIG. 4 illustrates a block diagram of an example remote control system, according to some embodiments. Remote control system 400 of FIG. 4 can include remote control system 303 of FIG. 3.

In some embodiments, remote control system 400 can include user interface module 402, processing module 404, radiation source 406, and optical controller 408. Remote control system 400 can include additional or fewer components.

According to some embodiments, a user interacts with remote control system 400 using user interface module 402. In some embodiments, user interface module 402 can include (or be connected to) a keyboard, a dial, a slider, or the like that the user can use to operate remote control system 400. Additionally, or alternatively, user interface module 402 can include (or be connected to) a touchpad, a touchscreen, or the like that the user can use to operate remote control system 400. Additionally, or alternatively, user interface module 402 can include (or be connected to) a microphone and an audio command processing module or the like that the user can use to operate remote control system 400. Additionally, or alternatively, user interface module 402 can include (or be connected to) a gesture detection system configured to detect the user's gestures for operating remote control system 400.

User interface module 402 can include (or be connected to) other components to receive the user's commands. For example, in some embodiments, user interface module 402 can include a radio receiver (or transceiver) configured to receive RF signals. For example, user interface module 402 can include a Bluetooth™ receiver (or transceiver), a WLAN receiver (or transceiver), a cellular receiver, or the like, configured to receive RF signals. In this embodiment, remote control system 400 can receive the RF signal and convert the RF signal to an optical radiation projection (e.g., an IR radiation projection).

In some embodiments, remote control system 400 includes processing module 404. Processing module 404 can be configured to be coupled to and communicate with user interface module 402. In some embodiments, processing module 404 is configured to receive a signal from user interface module 402 based on the command provided by the user to remote control system 400. Processing module 404 is configured to determine the user's command based on the signal received from user interface module 402, and generate one or more remote control codes for controlling a device (e.g., device 301 of FIG. 3).

According to some embodiments, processing module 404 is coupled to radiation source 406. Processing module 404 can control radiation source 406 based on the generated one or more remote control codes. Radiation source 406 is configured to generate radiation projection 409 based on the remote control code(s). Radiation projection 409 generated based on the remote control code(s) can control the device (e.g., device 301 of FIG. 3) being controlled by remote control system 400.

According to some embodiments, radiation source 406 includes one or more IR radiation sources configured to generate IR radiation projection 409. For example, radiation source 406 can include one or more light emitting diodes (LEDs). However, this disclosure is not limited to the IR radiation source and radiation source 406 can include other types of sources generating other types of EMF projections 409.

According to some embodiments, remote control system 400 can include optical controller 408. Optical controller 408 is configured to receive radiation projection 409 (and/or other EMF projection) and to adjust one or more parameters associated with radiation projection 409 before radiation projection 409 is emitted to the device (e.g., device 301 of FIG. 3) being controlled by remote control system 400. For example, optical controller 408 receives radiation projection 409 and adjusts one or more parameters associated with radiation projection 409 to generate radiation projection 411 (e.g., an adjusted radiation projection). Radiation projection 411 is output from remote control system 400 to the device (e.g., device 301 of FIG. 3) being controlled by remote control system 400.

According to some embodiments, optical controller 408 is an add-on component that is added to remote control device 410. In these embodiments, optical controller 408 is a separate component/device that can be added to a remote control device (e.g., remote control device 410). The added optical controller 408 can be further calibrated with remote control device 410 such that remote control system 400 can operate as intended. Additionally, or alternatively, optical controller 408 is part of remote control device 410. In these embodiments, optical controller 408 is not a separate component/device that is being added on a remote control device (e.g., remote control device 410). In these embodiments, optical controller 408 is part of the remote control device (e.g., remote control device 410). In these examples, remote control device 410 is the same as or substantially the same as remote control system 400.

According to some embodiments, optical controller 408 can include one or more components configured to adjust convergence and/or divergence of radiation projection 409 to generate radiation projection 411. For example, optical controller 408 can control the light projection focal point of radiation projection 409. Radiation projection 409 can include radiation rays that are emitted in a wide angle. In some embodiments, optical controller 408 can control radiation projection 409 to adjust the radiation rays to become parallel or substantially parallel. Additionally, or alternatively, optical controller 408 can control radiation projection 409 to adjust the radiation rays to control the light projection focal point of radiation projection 409.

By controlling the convergence and/or divergence of radiation projection 409, the directionality and target specificity of radiation projection 411 can be controlled. For example, by controlling the convergence and/or divergence of radiation projection 409, remote control system 400 can control the operations of its corresponding device without affecting the operations of other devices. Additionally, by controlling the convergence and/or divergence of radiation projection 409, remote control system 400 can consume less power. Since remote control system 400 can control the directionality and target specificity of radiation projection 411, remote control system 400 can consume less power to generate a less powerful/bright radiation projection 409 or 411.

According to some embodiments, optical controller 408 can include one or more optical collimators configured to receive radiation projection 409 and to adjust the convergence and/or divergence of radiation projection 409 and generate radiation projection 411. Radiation projection 411 can be a collimated radiation projection that can include a radiation projection with a plurality of radiation rays within the radiation projection that are parallel or substantially parallel to each other, according to some embodiments. Additionally, or alternatively, radiation projection 411 can be a collimated radiation projection that has a larger beam diameter that radiation projection 409 or has a smaller beam diameter that radiation projection 409.

According to some embodiments, the divergence of radiation projection 409 or 411 can be defined as a ratio of the size of the radiation source to a focal length of the optical collimator. In some examples, to achieve an acceptable or required divergence of radiation projection 411, the size of radiation source 406 can be reduced, the focal length of the optical collimator can be increased, or both.

According to some embodiments, the optical collimator of optical controller 408 can include one or more curved lens. For example, the optical collimator can include a convex lens and an aperture (e.g., an adjustable aperture) located at the focal plane of the convex lens. Additionally, or alternatively, the optical collimator can include one or more curved mirrors. For example, the optical collimator can include a concave mirror and an aperture (e.g., an adjustable aperture) located at the focal plane of the concave mirror. However, the embodiments of this disclosure are not limited to these examples and other collimator systems can be used to adjust the convergence and/or divergence of radiation projection 409.

According to some embodiments, the optical collimator of optical controller 408 is a fixed optical collimator. Alternatively, the optical collimator of optical controller 408 is an adjustable optical collimator. For example, the adjustable optical collimator can include one or more of an adjustable curved lens or one or more adjustable curved mirrors where one or more parameters of the adjustable curved lens or the adjustable curved mirror can be controlled. In an example, the adjustable optical collimator can include one or more of an adjustable lens or one or more adjustable mirrors where one or more parameters of the adjustable lens or the adjustable mirror can be controlled. Additionally, or alternatively, adjusting the optical collimator of optical controller 408 can include moving the curved lens or the curved mirror relative to, for example, an aperture and/or radiation source 406. Additionally, or alternatively, adjusting the optical collimator of optical controller 408 can include controlling an adjustable aperture.

According to some embodiments, a user of remote control system 400 can be configured to control the adjustable optical collimator of optical controller 408 to further adjust the divergence and/or convergence of radiation projection 409 or 411.

Figure 5:
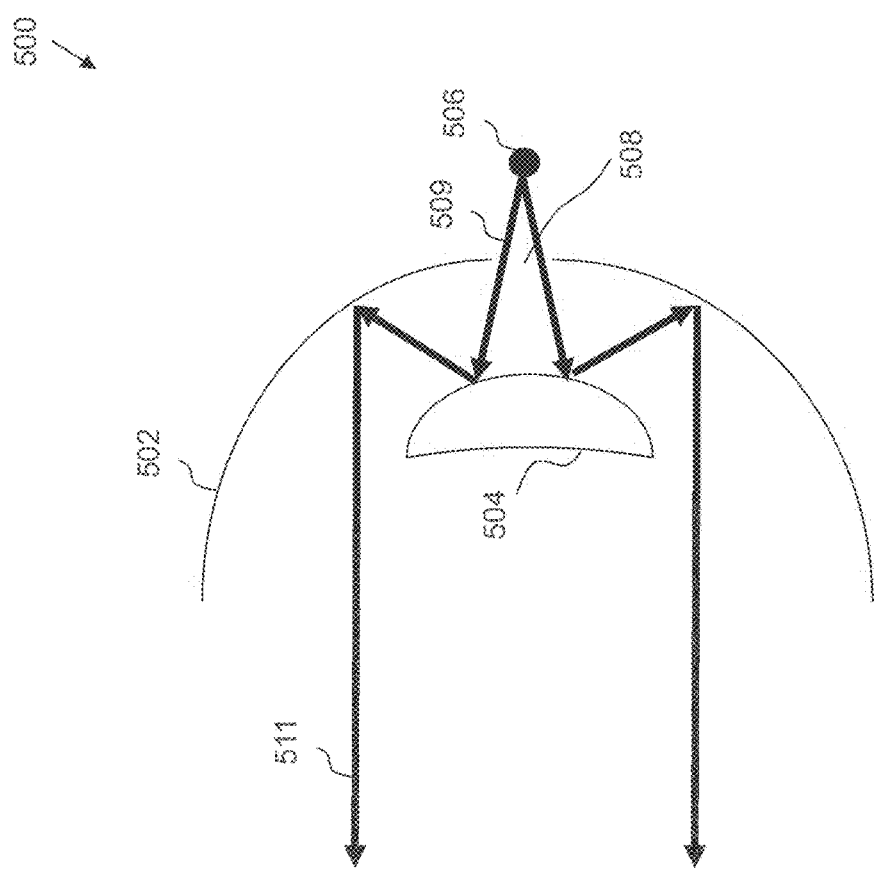
FIG. 5 illustrates a block diagram of an example optical collimator of an optical controller, according to some embodiments of this disclosure.

FIG. 5 illustrates a block diagram of an example optical collimator of an optical controller, according to some embodiments. Optical collimator 500 is provided as one example of a collimator that can be used in (or as) optical controller 408 of FIG. 4. However, the embodiments of this disclosure are not limited to this example and other collimator systems can be used.

In some embodiments, optical collimator 500 can be used as an add-on component to be added to remote control device 410 to generate control system 400. Other collimators can be used as add-on collimators or as collimators that are part of remote control device 410.

As illustrated in FIG. 5, optical collimator 500 can include curved mirror 502 (e.g., a concave mirror) and curved mirror 504 (e.g., a convex mirror). As illustrated in FIG. 5, radiation source 506 (e.g., radiation source 406 of FIG. 4) generates radiation projection 509 (e.g., radiation projection 409 of FIG. 4). Radiation projection 509 can enter collimator 500 or curved mirror 502 through cavity 508 in, for example, curved mirror 502. Radiation projection 509 can be reflected by curved mirror 504 and then curved mirror 502 to generate collimated radiation projection 511 (e.g., radiation projection 411 of FIG. 4). In at least one embodiment, the curved mirror can include a combination of one or more flat mirrors. In another embodiment the curved mirror can include a mirror having a form of a bend or curve.

In some examples, curved mirror 504 can be coupled to an arm that can move curved mirror 504 with respect to curved mirror 502. In some embodiments, optical collimator 500 can control the convergence and/or divergence of radiation projection 511 by at least one or more of moving curved mirror 504 with respect to curved mirror 502, controlling cavity 508, controlling curvature of curved mirror 502 and/or 504, moving curved mirror 502 and/or 504 with respect to radiation source 506, moving radiation source 506 with respect to curved mirror 502 and/or 504, or the like.

Referring back to FIG. 4, remote control system 400 can include optional second radiation source 412 for calibration purposes. In some embodiments, optional second radiation source 412 can generate a visible radiation projection 413. The visible radiation projection can go through the same optical controller 408 that adjusts radiation projection 409. Adjusted visible radiation projection 415 can be emitted to the device being controlled by remote control system 400. Using visible radiation projection 415, the user of remote control system 400 can observe how optical controller 408 affects radiation projection 411.

In a non-limiting example, the user of remote control system 400 can set remote control system 400 in a calibration mode using, for example, user interface module 402. In this calibration mode, processing module 404 can turn on optional second radiation source 412. When the user uses and/or adjusts optical controller 408 to generate radiation projection 411, the user can also observe the effects of optical controller 408 (or adjusting optical controller 408) using visible radiation projection 415. For example, the user can observe the directionality and device specificity of remote control system 400 by observing visible radiation projection 415. In another example, when the user adjusts optical controller 408 (e.g., the optical collimator), the user can observe the light projection focal point of visible radiation projection 415. In another example, visible radiation projection 415 can indicate which device and where on the device (that is being controlled) radiation projection 411 is emitted. In this example, the user of remote control system 400 can observe visible radiation projection 415 and estimate which device and where on the device radiation projection 411 is emitted.

In some embodiments, optional second radiation source 412 can be an add-on component that is separate from remote control device 410 and is added to remote control device 410. Additionally, or alternatively, optional second radiation source 412 can be part of optional second radiation source 412 to make remote control system 400. Although FIG. 4 was discussed with respect to adjusting convergence and/or divergence of radiation projection 409, optical controller 408 can include one or more components configured to adjust convergence and/or divergence of an EMF projection.

According to some embodiments, optical controller 408 of remote control system 400 can include one or more components configured to adjust a polarization of radiation projection 409 to generate radiation projection 411. For example, optical controller 408 can include one or more polarizers configured to receive radiation projection 409, adjust a polarization of radiation projection 409, and generate radiation projection 411 (e.g., an adjusted radiation projection). In an example, optical controller 408 can include two polarizers configured to receive radiation projection 409, adjust a polarization of radiation projection 409, and generate radiation projection 411 (e.g., an adjusted radiation projection).

By using the polarizers (e.g., two polarizers) at remote control system 400 and corresponding polarizer(s) at a receiver at the device being controlled by the remote control system 400, the communication between remote control system 400 and its corresponding device can be improved. For example, by adjusting the polarization of radiation projection 409, the target specificity of remote control system 400 can be controlled. For example, by controlling the polarization of radiation projection 409, remote control system 400 can control the operations of its corresponding device without affecting the operations of other devices. In addition to, or alternate to, controlling the target specificity of remote control system 400, adjusting the polarization of radiation projection 409 can be used to multiplex different data and/or control signals at remote control system 400, as discussed above.

According to some embodiments, the polarizer of optical controller 408 can be configured to selectively pass (or transmit) a desired polarization state of the radiation projection 409 while reflecting, absorbing, or deviating the rest of the radiation projection 409. In some examples, the polarizers of optical controller 408 can include dichroic polarizers configured to selectively pass (or transmit) the desired polarization state of radiation projection 409 while absorbing the rest of the radiation. Additionally, or alternatively, the polarizers of optical controller 408 can include reflective polarizers configured to selectively pass (or transmit) the desired polarization state of radiation projection 409 while reflecting the rest of the radiation.

Additionally, or alternatively, the polarizers of optical controller 408 can include one or more circular polarizers configured to generate circularly polarized IR radiation projection 411. Additionally, or alternatively, the polarizers of optical controller 408 can include circular polarizers configured to selectively pass (or transmit) desired circularly polarized (e.g., clockwise or counter-clockwise) state of radiation projection 409 while reflecting, absorbing, or deviating the rest of the radiation. In at least one embodiment, the polarizers of optical controller 408 can include elliptical polarizers configured to selectively pass (or transmit) desired elliptically polarized (e.g., clockwise or counterclockwise) state of radiation projection 409 while reflecting, absorbing, or deviating the rest of the radiation.

The embodiments of this disclosure are not limited to these examples and the polarizers of optical controller 408 can include other types and number of polarizers.

As discussed above and referring back to FIG. 3, when a first polarizer is used at remote control system 303a, a second polarizer can be used at device 301a that has the same polarization as the first polarizer of remote control system 303a. In some examples, if remote control system 303a has an adjustable polarizer (e.g., a disc with a first polarizer element and a second polarizer element), the first polarizer element can be used for controlling device 301a. In this example, the receiver at device 301a can include a polarizer having the same polarization as the first polarizer element. The second polarizer element at remote control system 303a can be used to control device 301b. In this example, the receiver at device 301b can include a polarizer having the same polarization as the second polarizer element.

According to some embodiments, one or more of the polarizers of optical controller 408 are fixed polarizers. Additionally, or alternatively, one or more of the polarizers of optical controller 408 are adjustable polarizers. For example, the adjustable polarizer can include one or more polarizer elements. Controlling the adjustable polarizer can include controlling one or more parameters associated with the one or more polarizer elements.

Figure 6A:
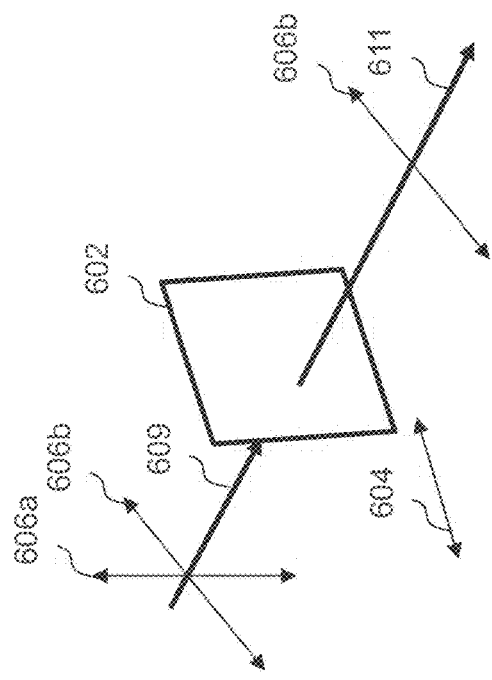
FIGS. 6A and 6B illustrate block diagrams of example polarizers (e.g., optical polarizers) of an optical controller, according to some embodiments of this disclosure.
Figure 6B:
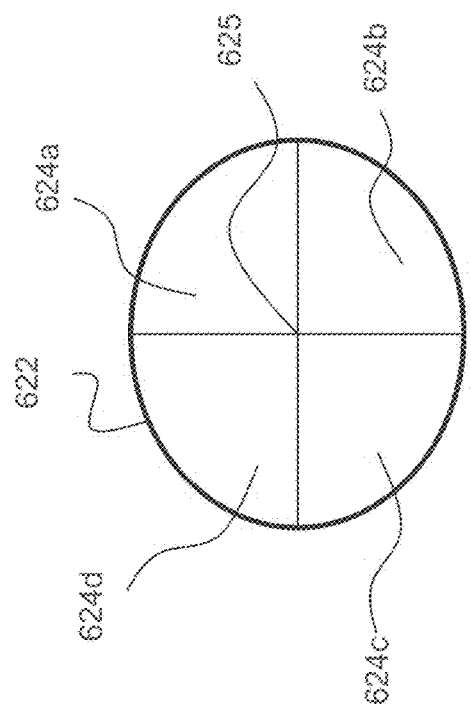

FIGS. 6A and 6B illustrate block diagrams of example polarizers (e.g., optical polarizers) of an optical controller, according to some embodiments. Polarizers 602 and 622 are provided as examples of a polarizer that can be used in (or as) optical controller 408 of FIG. 4. However, the embodiments of this disclosure are not limited to these examples and other polarization systems can be used.

FIG. 6A illustrates an exemplary polarizer 602 that can be used in optical controller 408. In some examples, polarizer 602 can be a fixed polarizer and not adjustable. Additionally, or alternatively, polarizer 602 can be an adjustable polarizer. For example, polarizer 602 can be configured to move along direction 604 to enter or exit radiation projection 609. For example, radiation projection 609 (e.g., radiation projection 409 of FIG. 4) can include two perpendicular polarization states 606a and 606b. Polarization 602, when set in the path of radiation projection 609, can pass one polarization state (e.g., polarization state 606b) in radiation projection 611 (e.g., radiation projection 411). By moving polarizer 602 out of the path of radiation projection 609, radiation projection 611 can have both polarization states 606a and 606b.

In some examples, polarizer 602 can include two or more polarizer elements. Moving polarizer 602 can set different polarizer elements in the path of radiation projection 609 passing different polarizer states of radiation projection 609. In a non-limiting example, polarizer 602 can have two polarizer elements (not shown). In a first position of polarizer 602, a first element of polarizer 602 can pass polarization state 606a of radiation projection 609 in radiation projection 611. In a second position of polarizer 602, a second element of polarizer 602 can pass polarization state 606b of radiation projection 609 in radiation projection 611.

In some examples, a dial, a slider, a key, or the like can be coupled to polarizer 602 to move polarizer 602. The dial, the slider, the key, or the like can be controlled manually by the user of remote control system 400 and/or can be controlled automatically, according to some embodiments.

FIG. 6B illustrates another exemplary polarizer 622 that can be used in optical controller 408. In some examples, polarizer 622 can be a fixed polarizer and not adjustable. Additionally, or alternatively, polarizer 622 can be an adjustable polarizer. For example, polarizer 622 can be configured to rotate along an axis at center 625.

In some examples, polarizer 622 can include two or more polarizer elements 624a-624d. Rotating polarizer 622 can set different polarizer elements 624 in the path of a radiation projection (e.g., radiation projection 409) passing different polarizer states of the radiation projection. In a non-liming example, polarizer 622 can have four polarizer elements 624a-624d. In a first position of polarizer 622, polarizer element 624a can pass a first polarization state of the radiation projection (e.g., radiation projection 409). When polarizer 622 is rotated, in a second position of polarizer 622, polarizer element 624b can pass a second polarization state of the radiation projection (e.g., radiation projection 409). And so on. In some examples, polarizer elements 624a and 624c can have the same polarization property and polarizer elements 624b and 624d can have the same polarization property. The polarization of polarizer elements 624a and 624b can be different. The polarization states can include planar polarization states, according to some embodiments.

In some examples, a dial, a slider, a key, or the like can be coupled to polarizer 622 to move polarizer 622. The dial, the slider, the key, or the like can be controlled manually by the user of remote control system 400 and/or can be controlled automatically, according to some embodiments.

In some embodiments, the polarizer of optical controller 408 (e.g., polarizer 602 and/or 622) can be used as an add-on component to be added to remote control device 410 to generate control system 400. Additionally, or alternatively, the polarizer of optical controller 408 (e.g., polarizer 602 and/or 622) can be part of remote control device 410.

Although FIG. 4 was discussed with respect to adjusting the polarization of radiation projection 409, optical controller 408 can include one or more components configured to adjust the polarization of an EMF projection.

According to some embodiments, optical controller 408 of remote control system 400 can include one or more components configured to configured to adjust (e.g., reduce or attenuate) an energy of radiation projection 409 to generate radiation projection 411. For example, optical controller 408 can include one or more attenuators configured to receive radiation projection 409, adjust the energy (e.g., a signal power level such as the brightness) of radiation projection 409, and generate radiation projection 411 (e.g., an adjusted radiation projection). By controlling the energy of radiation projection 409, the directionality, signal specificity, and target specificity of remote control system 400 can be controlled. For example, by controlling the energy of radiation projection 409, remote control system 400 can control the operations of its corresponding device without affecting the operations of other devices.

Figure 7A:
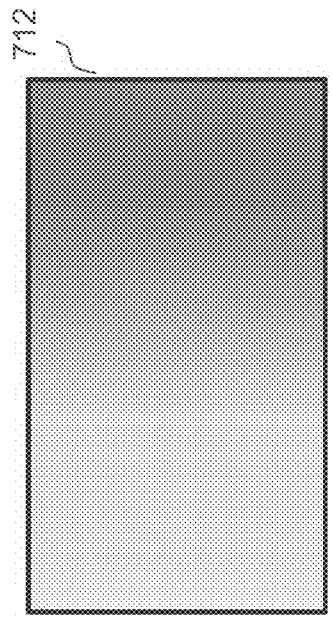
FIGS. 7A-7C illustrate block diagrams of example attenuators (e.g., optical attenuators) of an optical controller, according to some embodiments of this disclosure.
Figure 7B:
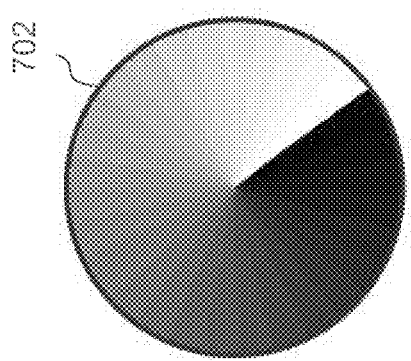
Figure 7C:
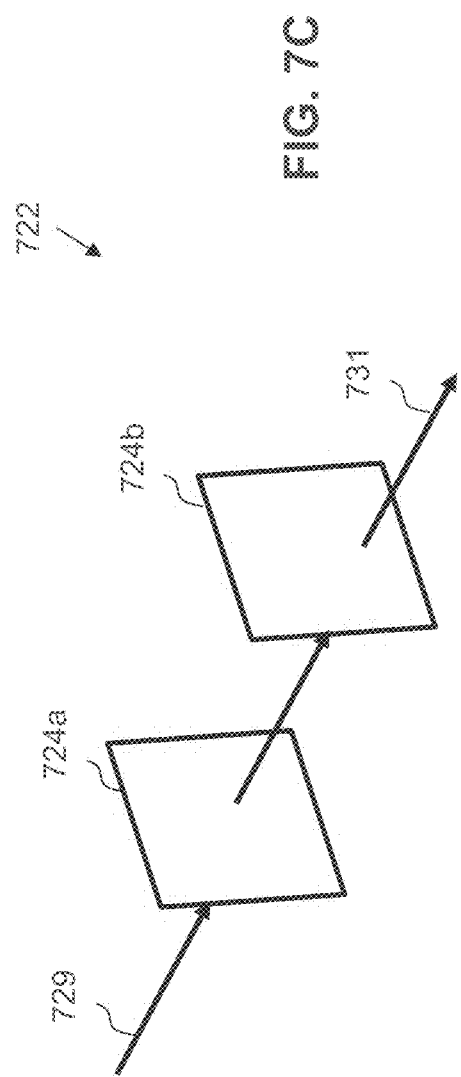

FIGS. 7A-7C illustrate block diagrams of example attenuators (e.g., optical attenuators) of an optical controller, according to some embodiments. Attenuators 702, 712, and 722 are provided as examples of an attenuators that can be used in (or as) optical controller 408 of FIG. 4. However, the embodiments of this disclosure are not limited to these examples and other attenuation systems can be used.

FIG. 7A illustrates an exemplary neutral density filter 702. In an embodiment, the neutral density filter is a graduated neutral density filter. In the example of FIG. 7A, neutral density filter 702 is a neutral density filter oriented in a polar manner where the density of the filter changes in a circular manner. In this example, by rotating neutral density filter 702, the attenuation of neutral density filter 702 changes (e.g., gradually changes). In other words, neutral density filter 702 includes graduation oriented in a polar manner to allow for rotated attenuation (e.g., selective attenuation by rotation through gradually increased filtering). Therefore, by rotating neutral density filter 702, the energy (e.g., a signal power level such as the brightness) of radiation projection 409 can be controlled.

In some examples, a dial, a slider, a key, or the like can be coupled to neutral density filter 702 to rotate neutral density filter 702. The dial, the slider, the key, or the like can be controlled manually by the user of remote control system 400 and/or can be controlled automatically, according to some embodiments.

FIG. 7B illustrates another exemplary neutral density filter 712. In the example of FIG. 7B, neutral density filter 712 is a neutral density filter where the density of the filter changes in a linear manner. In this example, by moving (e.g., shifting or sliding) neutral density filter 712, the attenuation of neutral density filter 712 changes (e.g., gradually changes). In other words, neutral density filter 712 includes a linear graduation to allow for selection using a shifting or sliding mechanism. Therefore, by moving neutral density filter 712, the energy (e.g., a signal power level such as the brightness) of radiation projection 409 can be controlled.

In some examples, a dial, a slider, a key, or the like can be coupled to neutral density filter 712 to move (e.g., shift or slide) neutral density filter 712. The dial, the slider, the key, or the like can be controlled manually by the user of remote control system 400 and/or can be controlled automatically, according to some embodiments.

The embodiments of this disclosure are not limited to these exemplary neutral density filters and other neutral density filters and/or other optical filters can be used as one or more attenuators in optical controller 408 of FIG. 4.

FIG. 7C illustrates another exemplary attenuator 722. In some embodiments, attenuator 722 can include two polarizers 724a and 724b with an adjustable angle to modulate the attenuation of attenuator 722. FIG. 7C illustrates radiation projection 729 as an input to attenuator 722 and radiation projection 731 as an output of attenuator 722.

In some embodiments, the attenuator of optical controller 408 (e.g., attenuator 702, 712, and/or 722) can be used as an add-on component to be added to remote control device 410 to generate control system 400. Additionally, or alternatively, the attenuator of optical controller 408 (e.g., attenuator 702, 712, and/or 722) can be part of remote control device 410.

Although FIG. 4 was discussed with respect to adjusting (e.g., reducing or attenuating) an energy of radiation projection 409, optical controller 408 can include one or more components configured to adjust (e.g., reduce or attenuate) an energy of an EMF projection.

According to some embodiments, remote control system 400 can include an optional electronic attenuator (not shown) configured to attenuate radiation projection 409 (or any EMF projection) by, for example, attenuating a power provided to radiation source 406 used for generating radiation projection 409. In some embodiments, a dial, a slider, a key, or the like can be coupled the optional electronic attenuator (not shown) to control the operation of the optional electronic attenuator. In some embodiments, the optional electronic attenuator can also control optional second radiation source 412 that generates radiation projection 413. In some examples, the user of remote control system 400 can calibrate the optional electronic attenuator by adjusting the optional electronic attenuator and observing the effects of radiation projection 409 on the device to be controlled.

According to some embodiments, remote control system 400 and/or optical controller 408 can include an IR-to-RF (radio frequency) translator (not shown). In this example, the IR-to-RF translator receives radiation projection 409 and determines the remote control codes associated with radiation projection 409. The IR-to-RF translator then generates an RF signal based on the remote control codes to be transmitted to the device that is being controlled by remote control system 400. The IR-to-RF translator can include, or be coupled to, a transceiver to transmit the RF signal to the device that is being controlled. The RF signal can include a Bluetooth™ signal, a WLAN communication signal, a peer-to-peer signal, an RF signal associated with signal $3^{rd}$ Generation (3G), 4G, Long-Term Evolution (LTE), 5G, or 5G-NR (new radio), and the like. In this example, a parameter of radiation projection 409 (e.g., the frequency or the frequency range) is translated using the IR-to-RF translator of remote control system 400. According to some embodiments, remote control system 400 and/or optical controller 408 can include an EMF-to-EMF (frequency shifting) translator (not shown).

In some embodiments, remote control system 400 and/or optical controller 408 can further include an IR-to-IR translator (not shown). In these embodiments, the IR-to-IR translator can receive radiation projection 409 and determine the remote control code(s) associated with radiation projection 409. The IR-to-IR translator further uses the remote control code(s) to generate a second radiation projection (e.g., a second IR radiation projection). Optical controller 408 can control the second IR radiation projection. In these examples, the IR-to-IR translator can include a second radiation source configured to generate the second IR radiation projection (based on the received radiation projection 409) where the second IR radiation projection has better characteristics (compared to the received radiation projection 409) for adjustments.

Figure 8:
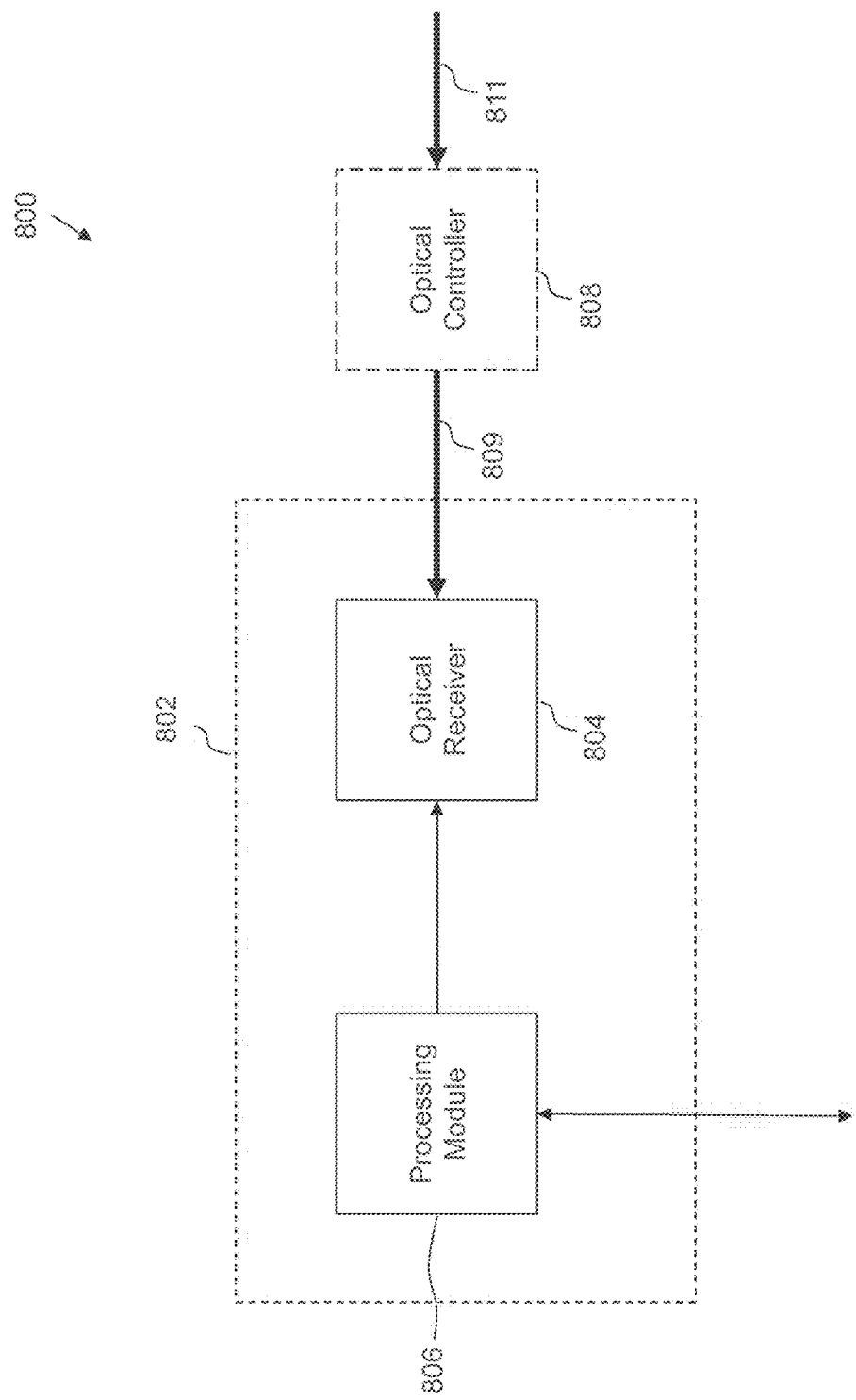
FIG. 8 illustrates a block diagram of an example receiver device, according to some embodiments of this disclosure.

FIG. 8 illustrates a block diagram of an example receiver device, according to some embodiments. Receiver device 800 of FIG. 8 can be implemented with device 301 of FIG. 3. For example, electronic device 802 can be similar to device 301 of FIG. 3 being controlled by remote control system 303 of FIG. 3 and/or remote control system 400 of FIG. 4. Electronic device 802 can include, but not is limited to, a televisions (TV), a set-top box, a cable box, a DVD or BLU-RAY player, a video player, an audio/video receiver, a game console, a digital video recording device, a computer, a smart phone, a tablet, a wearable device (such as a watch or glasses), an appliance, an internet of things (IoT) device, a projector, an electronic fan, an electronic heater, an air conditioning device, a camera, a camera flash, a light, a motorized shade, a door opener, and the like. Electronic device 802 can include receiver device 800. Receiver device 800 is configured to communicate with remote control system 303 of FIG. 3 and/or remote control system 400 of FIG. 4 to receive control signal(s) used for controlling operation of electronic device 802.

According to some embodiments, receiver device 800 can include an optical receiver configured to receive radiation projection 809. In some examples, radiation projection 809 can include radiation projection 411 from remote control system 400. Optical receiver 804 can include an IR receiver module configured to receive an IR radiation projection. However, optical receiver 804 can include any other receiver configured to receive an EMF projection (such as, but not limited to, IR radiation projection, UV radiation projection, RF signal, visible light, etc.) Optical receiver 804 can be coupled to processing module 806. According to some embodiments, optical receiver 804, alone or in combination with processing module 806, is configured to determine the remote control code(s) emitted by the remote control system. Processing module 806 transmits the remote control code(s), a control signal, and/or data to other components of device 802 to control the operations of these components.

According to some embodiments, receiver device 800 can include an optional optical controller 808. In some examples, optional optical controller 808 can be an add-on component to be added to the receive device 800. For example, optical controller 808 can be an add-on component to be added to electronic device 802. Additionally, or alternatively, optional optical controller 808 can be part of receiver device 800. For example, optical controller 808 can be part of electronic device 802.

In some embodiments, optional optical controller 808 can include a fixed or adjustable polarizer. The polarizer of optional optical controller 808 can be set based on the polarizer of optical controller 408 of remote control system 400, as discussed above. In this example, optional optical controller 808 can receive radiation projection 811. If the polarization state of radiation projection 811 is the same or substantially the same as the polarization (e.g., the polarization property) of the polarizer of optional optical controller 808, radiation projection 811 is passed through optional optical controller 808 as radiation projection 809. However, if the polarization state of radiation projection 811 is not the same or substantially the same as the polarization (e.g., the polarization property) of the polarizer of optional optical controller 808, radiation projection 811 is reflected, absorbed, or deviated by optional optical controller 808 and no radiation projection is incident on optical receiver 804. Therefore, directionality, target specificity, signal specificity, of the remote control system can be improved.

In some embodiments, by adjusting the polarizer of optional optical controller 808, receiver device 800 can operate with different remote control systems. For example, if the polarizer of optional optical controller 808 includes two or more polarizer components, by adjusting the polarizer of optional optical controller 808 to use a first polarizer component, receiver device 800 can operate with a first remote control system. Also, by adjusting the polarizer of optional optical controller 808 to use a second polarizer component, receiver device 800 can operate with a second remote control system.

As discussed above, some embodiments of this disclosure can improve one or more of directionality, target specificity, signal specificity, and bandwidth of a remote control system. For example, one or more of the direction specificity, target specificity, signal specificity, and bandwidth of the remote control system can be increased. Additionally, or alternatively, some embodiments of this disclosure can improve safety of devices being controlled by the remote control system as the directionality and target specificity are improved. Additionally, or alternatively, some embodiments of this disclosure can improve efficiency of using remote control codes for different remote control systems. In other words, the same or similar remote control codes (and/or the frequency of the EMF projection (e.g., IR radiation projection)) can be shared between more devices as the directionality, target specificity, and/or signal specificity can be controlled using one or more embodiments of this disclosure.

Although some examples of this disclosure are discussed with respect to a remote control system, the embodiments of this disclosure can be applied to other systems that use EMF projection (such as, but not limited to, IR radiation) for control and/or for illumination. For example, the embodiments of this disclosure can be applied to cameras such as night cameras for illumination purposes.

Also, the embodiments of this disclosure can be used when the radiation source (e.g., the IR radiation source) and the controller (e.g., the optical controller) that adjusts one or more parameters of the EMF projection (such as, but not limited to, the IR radiation projection) are located on a device other than a remote control device.

Figure 9:
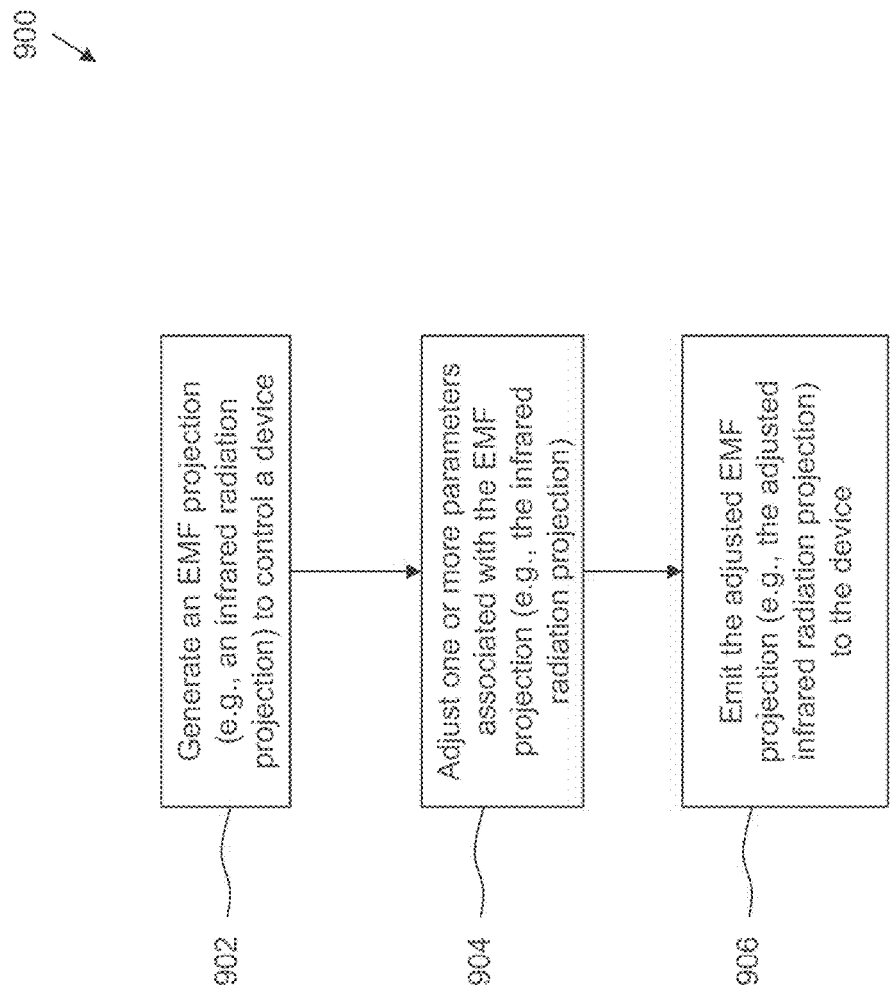
FIG. 9 illustrates an example method for a remote control system to generate and adjust an infrared radiation projection to control a device, according to some embodiments of this disclosure.

FIG. 9 illustrates an example method 900 for a remote control system generating and adjusting an infrared radiation projection to control a device, according to some embodiments of the disclosure. As a convenience and not a limitation, FIG. 9 may be described with regard to elements of FIGS. 1-8. Method 900 may represent the operation of a remote control system (e.g., remote control system 303 of FIG. 3 or remote control system 400 of FIG. 4) generating and adjusting an infrared radiation projection to control a device. But method 900 is not limited to the specific aspects depicted in those figures and other systems may be used to perform the method as will be understood by those skilled in the art. It is to be appreciated that not all operations may be needed, and the operations may not be performed in the same order as shown in FIG. 9.

At 902, an EMF projection (e.g., an infrared radiation projection) is generated. For example, a radiation source (e.g., radiation source 406 of FIG. 4) of a remote control system (e.g., remote control system 400) generates the EMF projection (such as, but not limited to the infrared radiation projection (e.g., radiation projection 409)) to control a device (e.g., device 301 of FIG. 3 and/or device 802 of FIG. 8). According to some embodiments, the radiation source includes one or more infrared light emitting diodes (LEDs) configured to generate the infrared radiation projection. However, the radiation source can include any other source configured to generate the EMF projection.

At 904, one or more parameters associated with the EMF projection (e.g., the infrared radiation projection) are adjusted. For example, an optical controller (e.g., optical controller 408 of FIG. 4) adjusts one or more parameters associated with the EMF projection (such as, but not limited to the infrared radiation projection (e.g., radiation projection 409)) before the adjusted EMF projection (such as, but not limited to the adjusted infrared radiation projection (e.g., radiation projection 411)) is emitted to the device that is being controlled. According to some embodiments, the one or more parameters associated with the EMF projection (e.g., the infrared radiation projection) can include a convergence and/or divergence of the EMF projection (e.g., the infrared radiation projection), a polarization of the EMF projection (e.g., the infrared radiation projection), an energy of the EMF projection (e.g., the infrared radiation projection), and a frequency of the EMF projection (e.g., the infrared radiation projection).

According to some embodiments, adjusting the one or more parameters associated with the EMF projection (e.g., the infrared radiation projection) can include adjusting a convergence and/or divergence of the EMF projection (e.g., the infrared radiation projection) using, for example, an optical collimator as discussed above with respect to FIGS. 4 and 5.

According to some embodiments, adjusting the one or more parameters associated with the EMF projection (e.g., the infrared radiation projection) can include adjusting a polarization of the EMF projection (e.g., the infrared radiation projection) using, for example, an optical polarizer as discussed above with respect to FIGS. 4, 6A, 6B, and 8.

According to some embodiments, adjusting the one or more parameters associated with the EMF projection (e.g., the infrared radiation projection) can include adjusting an energy of the EMF projection (e.g., the infrared radiation projection) using, for example, an optical attenuator as discussed above with respect to FIGS. 4 and 7A-7C. Additionally, or alternatively, adjusting the one or more parameters associated with the EMF projection (e.g., the infrared radiation projection) can include adjusting one or more parameters associated with a signal used to generate the EMF projection (e.g., the infrared radiation projection) using, for example, an electronic attenuator, as discussed above.

According to some embodiments, adjusting the one or more parameters associated with the EMF projection (e.g., the infrared radiation projection) can include generating an RF signal based on the EMF projection (e.g., the infrared radiation projection).

According to some embodiments, adjusting the one or more parameters associated with the EMF projection (e.g., the infrared radiation projection) can include generating a second infrared radiation projection based on the infrared radiation projection and adjusting one or more parameters associated with the second infrared radiation projection.

At 906, the adjusted EMF projection (e.g., the adjusted infrared radiation projection) is emitted to the device that is being controlled. For example, the adjusted EMF projection (such as, but not limited to the infrared radiation projection (e.g., radiation projection 411 of FIG. 4)) is emitted from the remote control system (e.g., remote control system 400) to the device that is being controlled by the remote control system (e.g., device 301 and/or device 802). In some embodiments, operation 906 can also include transmitting the RF signal that is generated based on the EMF projection (e.g., the infrared radiation projection).

EXAMPLE COMPUTER SYSTEM

Figure 10:
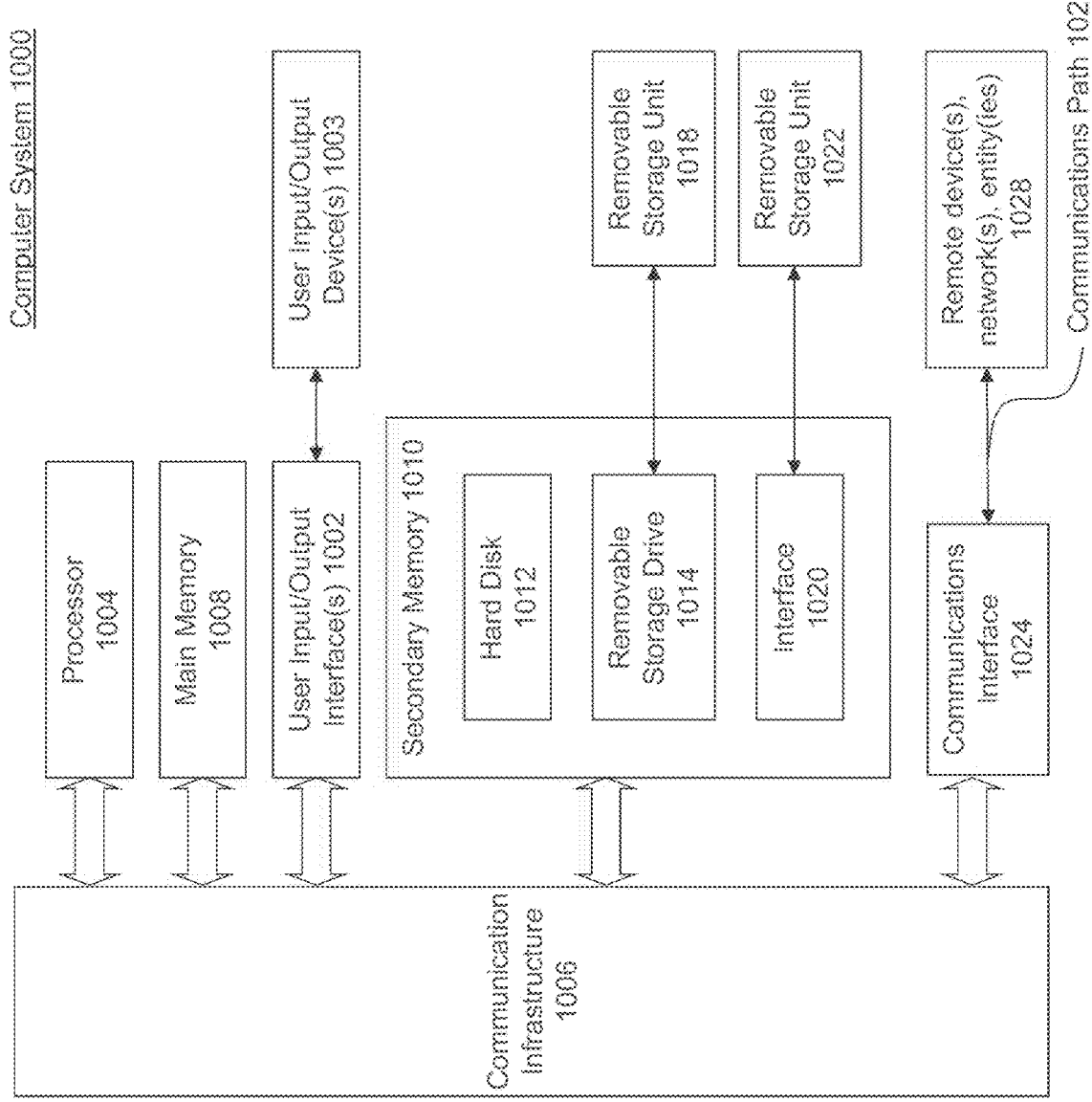
FIG. 10 illustrates an example computer system useful for implementing various embodiments.

Various embodiments may be implemented, for example, using one or more well-known computer systems, such as computer system 1000 shown in FIG. 10. For example, the media device 106 may be implemented using combinations or sub-combinations of computer system 1000. Also or alternatively, one or more computer systems 1000 may be used, for example, to implement any of the embodiments discussed herein, as well as combinations and sub-combinations thereof.

For example, in some embodiments, processing module 204, processing module 404, and/or processing module 806 may be implemented using combinations or sub-combinations of computer system 1000. Additionally, or alternatively, one or more operations for adjusting optical controller 408 and/or optical controller 808 can be implemented using combinations or sub-combinations of computer system 1000.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A remote control system, comprising:
a processing module configured to receive a signal from a user interface and generate, based on the received signal, one or more remote control codes for controlling a device;
a source coupled to the processing module and configured to generate an electric and magnetic field (EMF) projection based on the one or more remote control codes for controlling the device; and
a controller configured to adjust one or more parameters associated with the EMF projection before the EMF projection is emitted to the device to generate an adjusted EMF projection,
wherein the controller comprises a collimator configured to adjust convergence or divergence of the EMF projection such that the adjusted EMF projection out of the remote control system includes a plurality of radiation rays that are substantially parallel to each other, and
wherein the remote control system wirelessly communicates with the device.

2. A remote control system, comprising:
a radiation source configured to generate an infrared radiation projection based on one or more remote control codes to control a device; and
an optical controller configured to adjust one or more parameters associated with the infrared radiation projection before the infrared radiation projection is emitted to the device to generate an adjusted infrared radiation projection,
wherein the optical controller comprises a collimator configured to adjust convergence or divergence of the infrared radiation projection such that the adjusted infrared radiation projection out of the remote control system includes a plurality of radiation rays that are substantially parallel to each other.

3. The remote control system of claim 2, wherein the collimator is a fixed collimator.

4. The remote control system of claim 2, wherein the collimator is an adjustable collimator.

5. The remote control system of claim 2, wherein the optical controller further comprises a polarizer configured to adjust a polarization of the infrared radiation projection before the infrared radiation projection is emitted to the device.

6. The remote control system of claim 5, wherein the polarizer is a fixed polarizer or an adjustable polarizer.

7. The remote control system of claim 6, wherein the adjustable polarizer comprises a rotating polarizer including a plurality of polarizing elements.

8. The remote control system of claim 2, wherein the optical controller further comprises an attenuator configured to adjust an energy of the infrared radiation projection before the infrared radiation projection is emitted to the device.

9. The remote control system of claim 8, wherein the attenuator is configured to adjust a signal power level associated with the infrared radiation projection.

10. The remote control system of claim 8, wherein the attenuator comprises a neutral density filter.

11. The remote control system of claim 10, wherein the neutral density filter comprises graduation oriented in a polar manner to allow for selective attenuation by rotation through gradually increased filtering.

12. The remote control system of claim 10, wherein the neutral density filter comprises a graduated neutral density filter with a linear graduation to allow for selection using a shifting or sliding mechanism.

13. The remote control system of claim 2, further comprising an electronic attenuator configured to adjust one or more parameters associated with a signal used to generate the infrared radiation projection.

14. The remote control system of claim 2, wherein the optical controller comprises at least two of a collimator, a polarizer, and an attenuator.

15. The remote control system of claim 2, wherein the radiation source comprises one or more electric and magnetic field (EMF) sources configured to generate an EMF projection comprising the infrared radiation projection.

16. The remote control system of claim 2, wherein the optical controller is configured to adjust the one or more parameters associated with the infrared radiation projection such that direction specificity of the remote control system to control the device is increased.

17. The remote control system of claim 2, wherein the radiation source is part of a remote control device and the optical controller is an add-on device coupled to the remote control device.

18. The remote control system of claim 2, further comprising:
a processing module configured to receive a signal from a user interface and generate, based on the received signal, the one or more remote control codes for controlling the device.

19. The remote control system of claim 2, further comprising an electric and magnetic field (EMF)-to-EMF translator configured to receive the infrared radiation projection and generate an EMF signal based on the infrared radiation projection.

20. A system, comprising:
a remote control system, comprising:
a radiation source configured to generate an infrared radiation projection to control a device; and
an optical controller configured to adjust one or more parameters associated with the infrared radiation projection before the infrared radiation projection is emitted to the device to generate an adjusted infrared radiation projection,
wherein the one or more parameters comprise convergence or divergence of the infrared radiation projection such that the adjusted infrared radiation projection out of the remote control system includes a plurality of radiation rays that are substantially parallel to each other, and
wherein the one or more parameters further comprise one or more of a frequency or a frequency range associated with the infrared radiation projection, a polarization of the infrared radiation projection, or an energy of the infrared radiation projection; and
a receiver device located at the device to be controlled, the receiver device configured to receive the infrared radiation projection to generate a control signal for controlling the device.

* * * * *